(12) United States Patent
Hannebauer et al.

(10) Patent No.: US 7,478,328 B2
(45) Date of Patent: Jan. 13, 2009

(54) METHOD OF ENTERING A PRESENTATION INTO A COMPUTER

(75) Inventors: Markus Oliver Hannebauer, Berlin (DE); Volker Christian Schöch, Berlin (DE); Arno Schödl, Berlin (DE)

(73) Assignee: think-cell Software GmbH, Berlin (DE)

( * ) Notice: Subject to any disclaimer, the term of this patent is extended or adjusted under 35 U.S.C. 154(b) by 670 days.

(21) Appl. No.: 10/781,349

(22) Filed: Feb. 17, 2004

(65) Prior Publication Data

US 2005/0183009 A1 Aug. 18, 2005

(51) Int. Cl.
*G06F 3/00* (2006.01)
(52) U.S. Cl. .................. 715/731; 715/243; 715/244
(58) Field of Classification Search ................. 345/156; 715/530, 517, 518, 764, 769, 767
See application file for complete search history.

(56) References Cited

U.S. PATENT DOCUMENTS

| | | | | |
|---|---|---|---|---|
| 5,617,114 A | * | 4/1997 | Bier et al. | ................. 345/634 |
| 5,798,752 A | * | 8/1998 | Buxton et al. | ................. 715/863 |
| 6,993,709 B1 | * | 1/2006 | Lynn et al. | ................. 715/232 |
| 7,000,180 B2 | * | 2/2006 | Balthaser | ................. 715/500.1 |
| 7,093,192 B2 | * | 8/2006 | Mullen et al. | ................. 715/202 |
| 7,287,241 B2 | * | 10/2007 | Balsiger | ................. 717/105 |
| 2004/0030997 A1 | * | 2/2004 | Farrah | ................. 715/530 |
| 2005/0068290 A1 | * | 3/2005 | Jaeger | ................. 345/156 |

* cited by examiner

*Primary Examiner*—Stephen S Hong
*Assistant Examiner*—Omar Abdul-Ali
(74) *Attorney, Agent, or Firm*—Paul D. Bianco; Martin Fleit; Fleit Gibbons Gutman Bongini & Bianco PL

(57) ABSTRACT

A method of entering a presentation into a computer. A dynamic grid is provided by adding graphical objects to a logical container, i.e. an empty presentation page. The dynamic grid facilitates entering of constraints. The constraints can be used as an input for a constraint solver to provide an automatic layout.

9 Claims, 4 Drawing Sheets

METHOD OF ENTERING A PRESENTATION INTO A COMPUTER

BACKGROUND OF THE INVENTION

1. Field of the Invention

This invention relates generally to the field of computer graphics, and more particularly, without limitation to entering of information presentations.

2. Prior Art

Graphics are the easiest way to communicate information. The creation of graphic layouts or charts has progressed from manual pen and paper generation techniques to computer-aided techniques. Previously developed computer graphics programs or applications generally provide clean, professional graphics in a fraction of the time required for handwritten graphics.

However, these computer programs can be complicated to use and require many user interactions in order to enter an information presentation with logically arranged graphical objects. This is especially true for information presentations, i.e. for material that is intended to be viewed and manipulated by people, such as graphical user interfaces, World Wide Web documents, and conventional newspapers and magazines.

A presentation's layout can have a significant impact on how well it communicates information to and obtains information from those who interact with it. For example, the importance of individual objects can be emphasised or de-emphasised, and the relationships between objects can be made more or less clear. A well laid out presentation can visually guide a viewer to infer correct relationships about its objects, and to accomplish tasks quickly and correctly, e.g. by minimising the distance between objects to be manipulated sequentially, increasing the presentation's effectiveness.

The vast majority of layouts, even if made using a computer, are being created without much automatic support: A human graphic designer or "layout expert" makes most, if not all, of the decisions about the position and size of graphical objects to be used.

A simple approach to simplify the task of creating layouts, which is widely available in computer graphics programs, is to align graphical elements with an equally-spaced rectangular grid. A problem with this approach is that, in order to benefit from this grid, an object must span an integral number of fields in width and height. For example, two graphical objects, one spanning an even number of fields and the other an odd number, cannot be centered with respect to each other and both still lie on the grid.

To overcome this problem, graphics programs usually also allow the alignment of objects in relation to each other. This alignment is applied once when the user issues the appropriate demand, but is not maintained during later editing.

The vast majority of research in automated layout is focused on constraint-based methods. Spatial constraints define a certain alignment or size relationship between objects. Once they have been imposed on graphical objects, a constraint solver maintains them permanently across other editing operations. Constraints can also impose higher-level requirements, such as text formatting and sizing guidelines or object-type-dependent size and alignment constraints. Constraints are very powerful tools for layout generation. The main challenge, and a limitation to application in commercial products today, is to create a suitable user interface for intuitively specifying the abstract mathematical descriptions suitable for automatic constraint solving.

An overview of the prior art in constraint-based methods and constraint solvers, is provided in "A survey of automated layout techniques for information presentations", Simon Lok and Steven Feiner, Smart Graphics 2001, Hawthorne, N.Y., USA, the entirety of which is herein incorporated by reference.

SUMMARY OF THE INVENTION

The present invention provides a method of entering a presentation into a computer. A container having container grid lines is provided. The container grid lines delimit the container. For example, when the user wants to create a new presentation page, an empty presentation page is opened. The empty presentation page serves as a container; the borders of the presentation page provide the container grid lines.

Further, a set of graphical objects is provided. Each graphical object has a set of object grid lines. The object grid lines delimit the graphical object or are aligned with important graphical features of the object. For example, the graphical objects are shown as icons in a selection widget, e.g. a menu bar. A selection widget is any kind of graphical user interface element. The user can place a graphical object by clicking on an icon in the selection widget and selecting a desired position within the container. "Drag-and-drop" is a possible embodiment of such an interaction.

If an object grid line of the placed graphical object is positioned on one of the container grid lines, that object grid line is bound to that container grid line. "Binding" establishes the spatial constraint that the object grid line and the container grid line have the same position. This position can be fixed or variable depending on the user's choice.

If an object grid line of the placed graphical object is not positioned on a container grid line, an additional container grid line is generated at the position of the object grid line. The object grid line and the container grid line are bound. Again the position of the additional container grid line can be fixed or variable, depending on the user's choice.

In accordance with a preferred embodiment of the invention, the container grid lines and the object grid lines of graphical objects positioned within the container provide a dynamic grid with "snap-to-grid" functionality. This way the positioning of object grid lines on container grid lines and/or other object grid lines is facilitated.

In accordance with a further preferred embodiment of the invention, the actual positions of grid lines, and thereby the actual positions and sizes of graphical objects, are calculated from the spatial constraints imposed by grid line binding by a constraint-based automatic layout system, e.g. a so-called constraint solver. In addition to the spatial constraints imposed by the binding of object grid lines to container grid lines more constraints can be implied by the type of graphical objects (e.g., a "square box" object remains square), or can be added by the user (e.g., equal spacing of a group of grid lines).

The present invention is particularly useful for editing a slide presentation. By binding of object grid lines to other object grid lines through container grid lines logical relationships of objects are expressed in an intuitive way. This substantially reduces the number of user interactions and time required to edit a high quality slide presentation having a logical layout of its graphical objects. This is particularly useful as an add-on feature for slide presentation programs, such as those sold under the trademark MICROSOFT® POWERPOINT®. For example, the present invention can be implemented by means of a plug-in program module for slide presentation programs such as those sold under the trademark MICROSOFT® POWERPOINT®.

BRIEF DESCRIPTION OF THE DRAWINGS

In the following, preferred embodiments of the present invention will be explained in greater detail by making reference to the drawings, in which.

DETAILED DESCRIPTION OF PREFERRED EMBODIMENTS OF THE INVENTION

Figure 1:
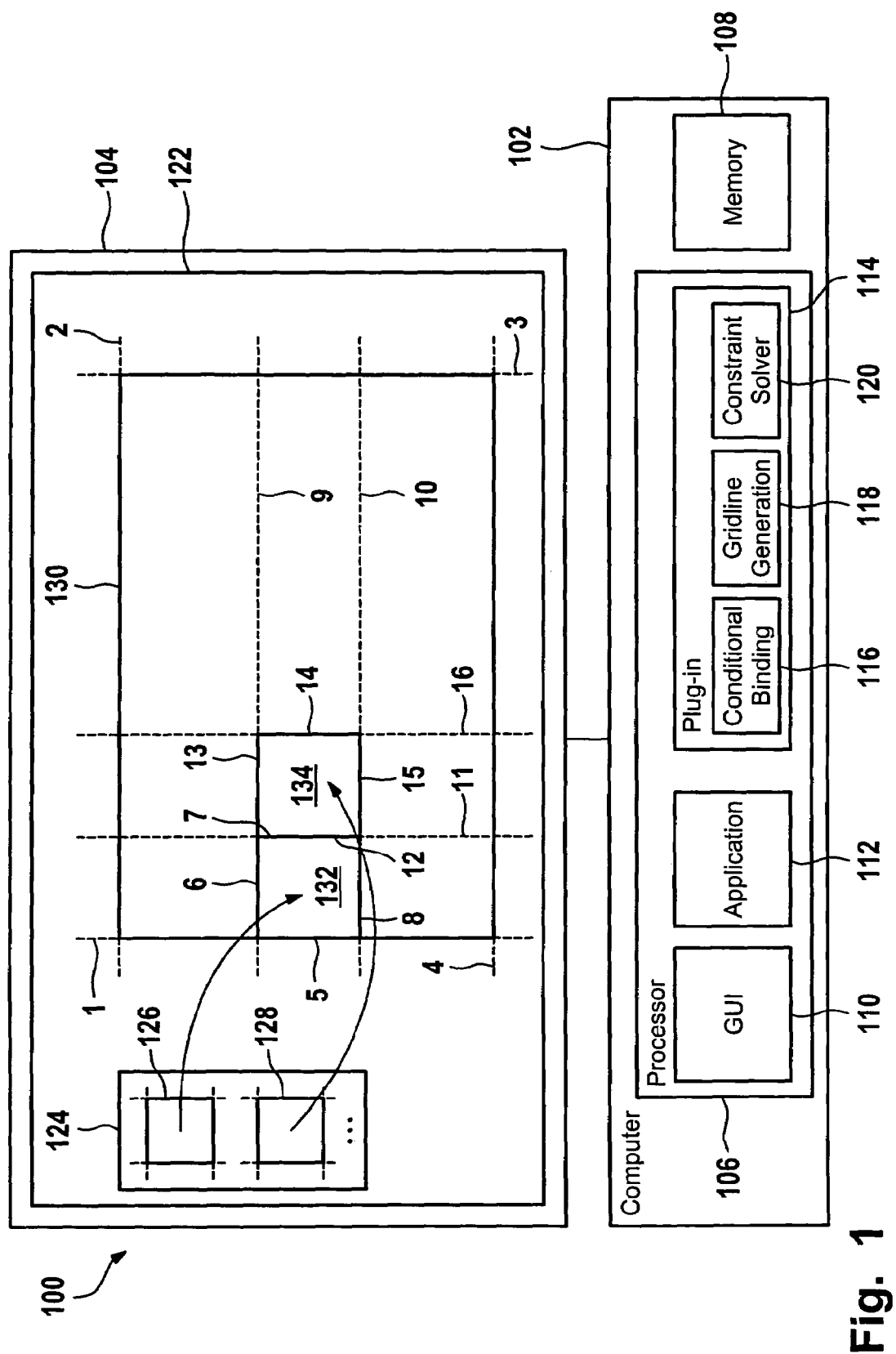
FIG. 1 is a block diagram of a preferred embodiment of a computer system of the invention.

FIG. 1 shows a block diagram of computer system 100. Computer system 100 has computer 102, such as a personal computer, coupled to display 104. Computer 102 has processor 106 and memory 108. Processor 106 serves to execute program module 110 which provides a graphical user interface (GUI). Further processor 106 runs application program 112. Preferably application program 112 is a drawing program, such as those sold under the trademark MICROSOFT® VISIO®, a web page editor, such as those sold under the trademark MICROSOFT® FRONTPAGE®, a layout program, such as those sold under the trademark ADOBE® INDESIGN®, or a program for preparing slide presentations, such as those sold under the trademark MICROSOFT® POWERPOINT®.

In addition, processor 106 runs plug-in program module 114 that provides additional functionalities to application program 112.

Plug-in program module 114 comprises conditional binding module 116, grid line generation module 118, and constraint solver 120.

In operation the graphical user interface provides window 122 on display 104. Window 122 is assigned to application program 112. Window 122 shows various tool bars and action bars of application program 112, which are used for entering, manipulating, opening, storing, saving, etc of electronic presentations.

By way of example selection widget 124 is shown in window 122. Selection widget 124 visualises a set of graphical objects by means of icons 126, 128, and so forth. For example icon 126 represents a geometric object, such as a line, a rectangle, a triangle, a circle, and so forth, whereas icon 128 represents a pie chart, org chart, a machine element, a circuit element, and so forth. Selection widget 124 may have a scroll bar or other input means for selection of icons. For convenience of explanation only two icons 126 and 128 are shown in selection widget 124 of FIG. 1.

Further window 122 shows presentation page 130. Page 130 is initially empty in the example considered here. Page 130 provides a logical container for receiving graphical objects. Page 130 is delimited by container grid lines 1, 2, 3 and 4 that define a rectangular region. This rectangular region may have the same size as page 130 or a smaller size to provide margins on page 130.

Graphical objects can be added to page 130 by means of the graphical user interface provided by program module 110.

In operation a user opens a new presentation such that empty page 130 is shown in window 122. Next the user places a graphical object, e.g. represented by icon 126, by clicking on icon 126 with a computer mouse (not shown in FIG. 1) and selecting a desired position within page 130.

When the user has finished this interaction, the graphical object 132 is created on page 130. Graphical object 132 has object grid lines 5, 6, 7, and 8 as represented by the dashed lines in FIG. 1. Graphical object 132 is positioned such that its object grid line 5 is positioned on container grid line 1 of page 130 whereas its object grid lines 6, 7, and 8 are not positioned on any of the container grid lines 1 to 4.

This invokes conditional binding module 116 of plug-in program module 114. As object grid line 5 is positioned on container grid line 1, object grid line 5 and container grid line 1 are bound. Binding of object grid line 5 to container grid line 1 is expressive of the spatial constraint that object grid line 5 is to be located at the same position as container grid line 1.

With respect to the object grid lines 6, 7 and 8 which are not positioned on any one of the container grid lines 1 to 4, grid line generation module 118 is invoked. Grid line generation module 118 generates an additional container grid line for each of the object grid lines of graphical object 132 that are not bound to one of the container grid lines 1 to 4 by conditional binding module 116. Hence, grid line generation module 118 generates additional container grid line 9 at the position of object grid line 6, additional container grid line 10 for object grid line 8 and additional container grid line 11 for object grid line 7.

Again this invokes conditional binding module 118 which now binds previously unbound object grid lines 6, 7, and 8 to their respective additional container grid lines, i.e. object grid line 6 is bound to container grid line 9, object grid line 8 to container grid line 10 and object grid line 7 to container grid line 11. Unlike container grid lines 1 to 4 which are fixed at the boundary of page 130 additional container grid lines 9 to 11 are movable such that a user may change the size of graphical object 132 after it has been dropped into page 130.

Next the user adds another graphical object by selecting icon 128 from selection widget 124 and selecting a desired position next to graphical object 132, for example by means of a "drag-and-drop" operation. When the user has finished this interaction, the graphical object 134 is created on page 130.

Graphical object 134 is delimited by object grid lines 12, 13, 14 and 15. Object grid line 12 is positioned on container grid line 11, object grid line 13 is positioned on container grid line 9, and object grid line 15 is positioned on container grid line 10. Hence the corresponding binding operations are performed by conditional binding module 116, i.e. object grid line 12 is bound to container grid line 11, object grid line 13 is bound to container grid line 9, and object grid line 15 is bound to container grid line 10. It is important to note that object grid line 12 is not directly bound to object grid line 7 but only through the intermediary of container grid line 11.

Object grid line 14 of graphical object 136 is not positioned on any one of the container grid lines. As a consequence an additional grid line 16 is generated by grid line generation module 118 to which object grid line 14 is then bound by conditional binding module 116.

The binding of object grid lines to container grid lines and the generation of additional container grid lines is stored in a suitable hierarchical data structure in memory 108. Constraint solver 120 is applied to the data structure stored in memory 108 for automatic layout. Constraint solver 120 automatically repositions and/or resizes graphical objects 132 and 134 as well as other graphical objects which may be added later in view of the constraints reflected in the data structure stored in memory 108.

In addition to the constraints stored in the hierarchical data structure of memory 108, i.e. the binding of object grid lines to container grid lines, there can be additional constraints being assigned to the graphical objects or to the grid lines of page 130. Such additional constraints may encompass a certain aspect ratio, minimum size, or text formatting of one of the graphical objects on page 130, or equal spacing of a group of grid lines. These additional constraints are also resolved by constraint solver 120.

Figure 2:
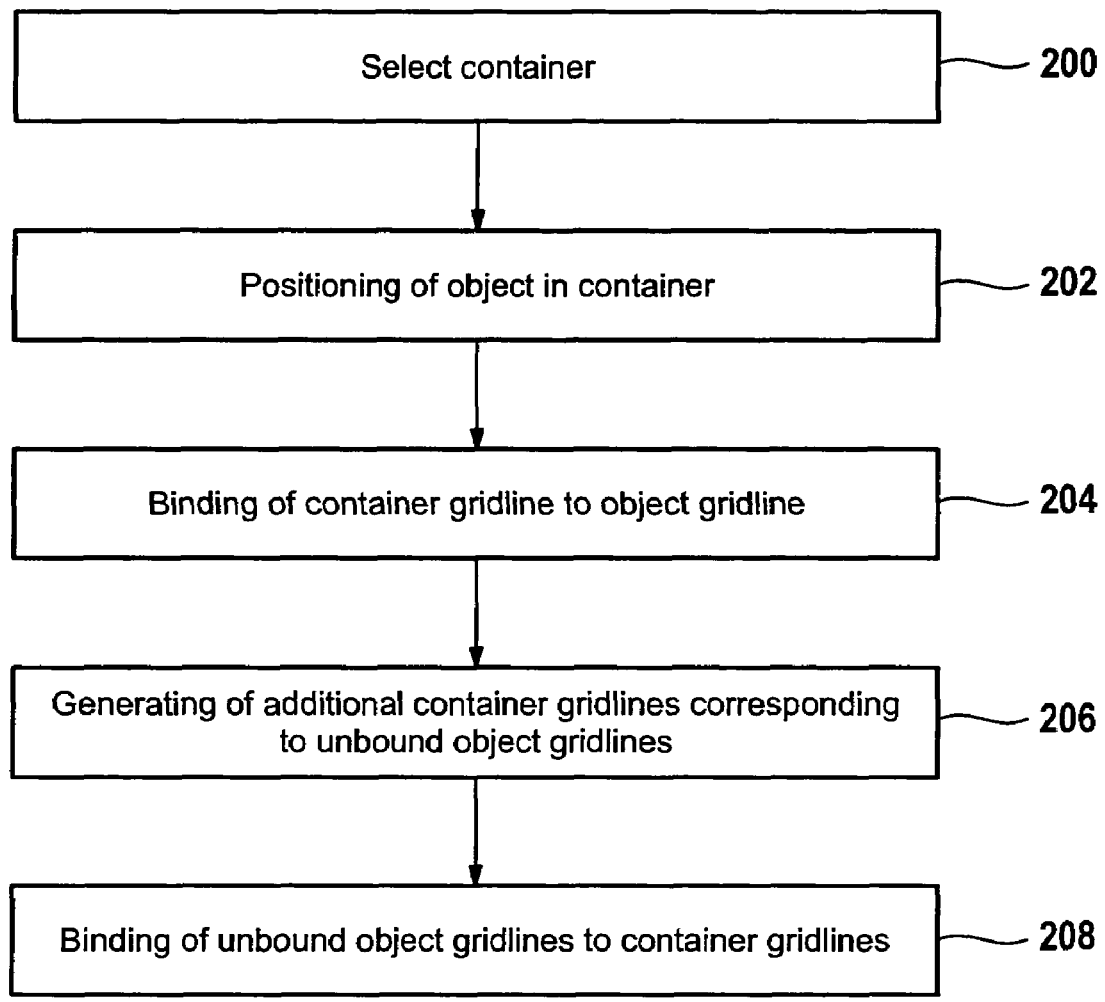
FIG. 2 is illustrative of a preferred embodiment of a method of the invention.
Figure 3:
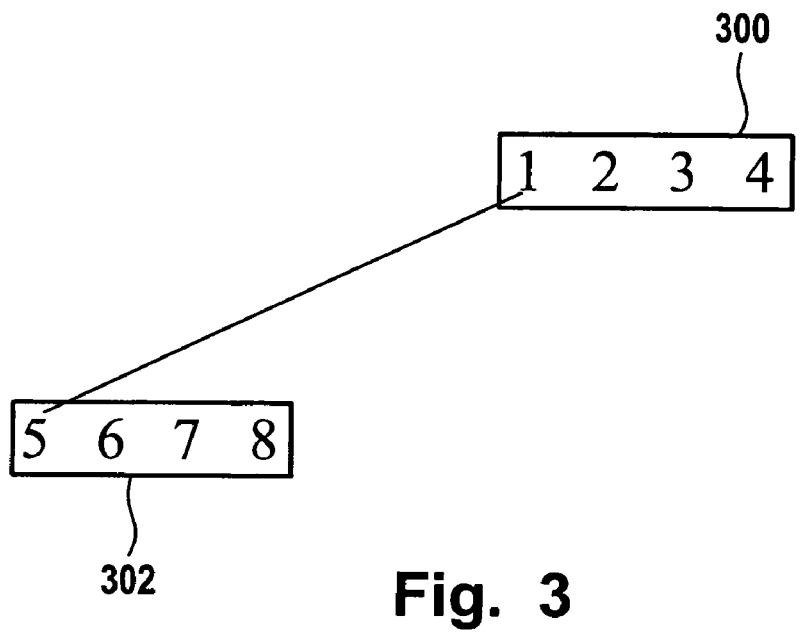
FIG. 3-FIG. 6 illustrate the creation of a hierarchical data structure being expressive of the binding of object grid lines to container grid lines.

FIG. 2 illustrates the corresponding procedure. In step 200 a logical container is selected. The container can be the entire page (cf. page 130 of FIG. 1) or a sub-region of a page. Such a sub-region serving as a container may be created by selecting a group of graphical objects on the page.

In step 202 the graphical object is positioned within the boundary of the container. Object grid lines of the graphical objects which are positioned on container grid lines are bound to the corresponding container grid lines in step 204. Additional container grid lines are generated at the positions of unbound object grid lines of the graphical object in step 206. In step 208 the previously unbound object grid lines are bound to the respective additional container grid lines in step 208. This procedure can be carried out repeatedly whereby a previously positioned graphical object or group of graphical objects can be selected in step 200 as a container for the purpose of positioning a further graphical object.

Next a constraint solver may be invoked in order to provide an automatic layout for the page being compliant with the constraints as expressed by the object grid lines being bound to container grid lines and additional constraints of graphical objects or grid lines, if any.

It is to be noted that the various container and object grid lines provide a dynamic grid which is built up when the user adds graphical objects to the presentation. Positioning of object grid lines on container grid lines when a new graphical object is added can be facilitated by a so called "snap-to-grid" functionality. This means that if an object grid line of a newly added graphical object is in close proximity to a container grid line, i.e. within a snap-in zone, the graphical object is automatically moved such that the object grid line is in fact positioned on the container grid line.

FIGS. 3 to 6 are illustrative of the hierarchical data structure stored in memory 108 of FIG. 1. The data structure consists of a hierarchical tree which initially has root node 300 and leaf node 302. Root node 300 contains representations of the container grid lines, i.e. container grid lines 1, 2, 3 and 4 of page 130. Leaf node 302 contains representations of object grid lines 5, 6, 7 and 8 of graphical object 132. Representation of container grid line 1 of root node 300 is connected to representation of object grid line 5 within leaf node 302 in order to store the binding of object grid line 5 to container grid line 1.

Figure 4:
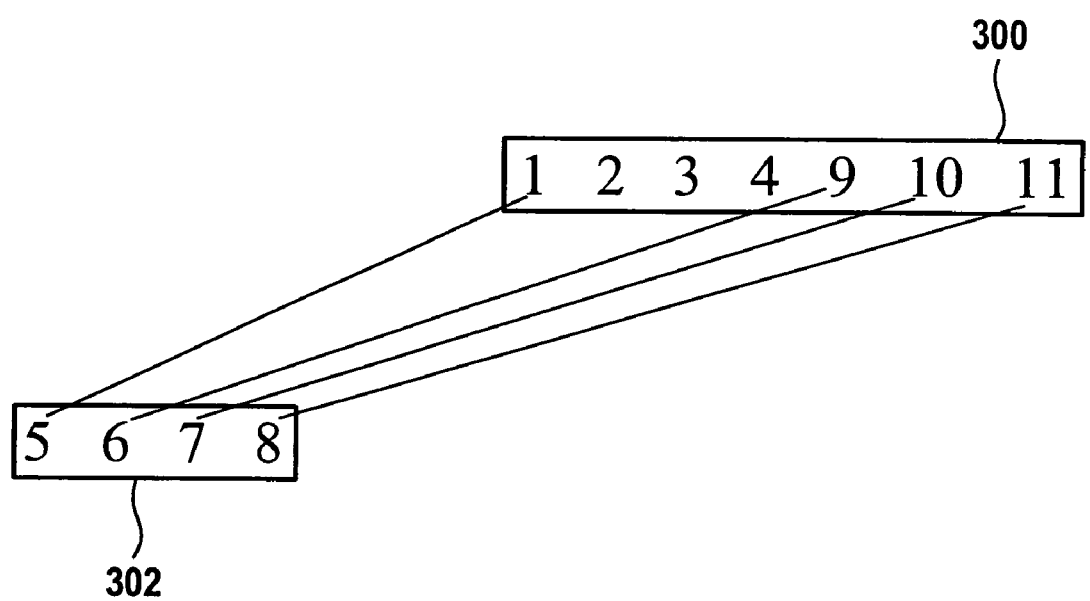

FIG. 4 shows the hierarchical tree structure after the additional container grid lines 9, 10 and 11 have been generated after the addition of graphical object 132 (c.f. FIG. 1). Representations of object grid lines 6, 7, and 8 are connected to respective additional container grid lines 9, 10, and 11 in order to store the corresponding bindings of object grid lines to additional container grid lines.

Figure 5:
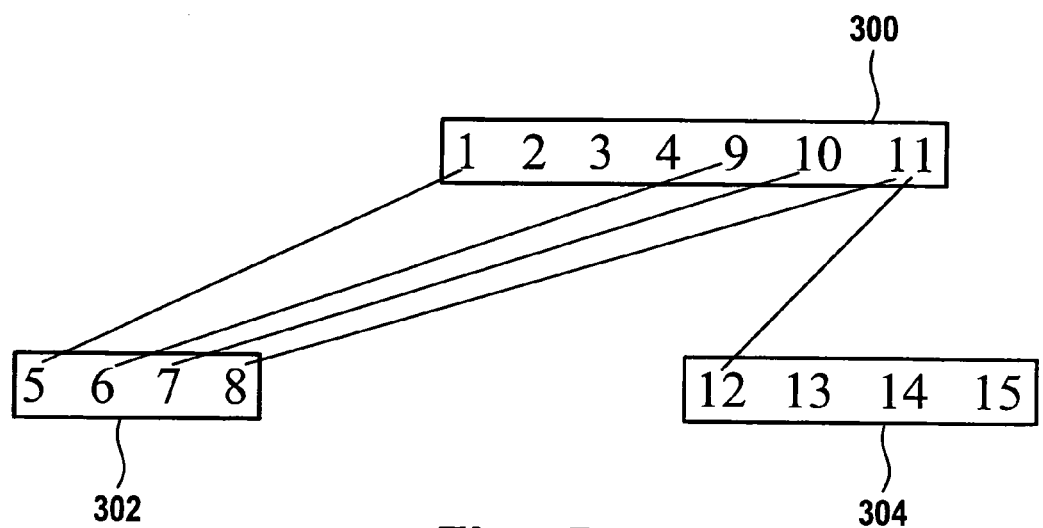
Figure 6:
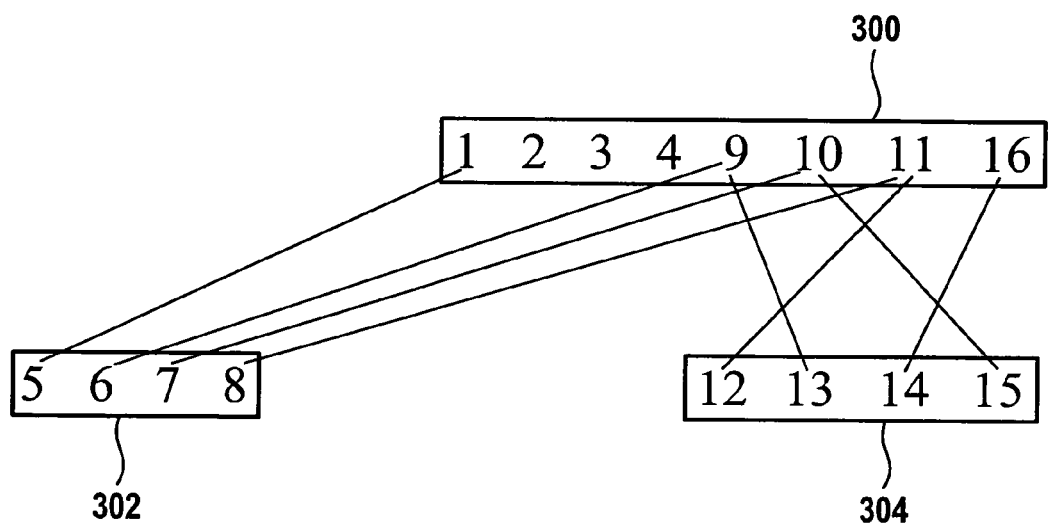

When graphical object 134 is added to the presentation leaf node 304 is added to the hierarchical tree structure as shown in FIG. 5. Leaf node 304 contains representations of object grid line 12, 13, 14, and 15 of graphical object 136. The representation of object grid line 12 is connected to representation of container grid line 11 in order to express the corresponding binding. Next additional container grid lines are generated for the unbound object grid lines 13, 14, and 15. The result is shown in FIG. 6.

It is to be noted that by using e.g. one of the graphical objects or a group of graphical objects, which have been previously added to the presentation as a container, more levels of hierarchy can be implemented. For example graphical object 132 can be selected as a container for adding other graphical objects. In this instance leaf node 302 acts as a root node for the next level of hierarchy.

Further it is to be noted that additional container grid lines can be generated when a graphical object with unbound object grid lines is added, as explained above. Alternatively the additional container grid lines can also be added when a graphical object is added to the presentation which has an object grid line to be bound to an object grid line of a previously entered graphical object through the intermediary of a container grid line.

Container grid lines bound to grid lines of graphical objects can be automatically deleted when the grid lines of graphical objects bound to it have all been unbound, for example because the graphical objects have been deleted or moved.

LIST OF REFERENCE NUMERALS 100 computer system
102 computer
104 display
106 processor
108 memory
110 program module
112 application program
114 plug-in program module
116 conditional binding module
118 grid line generator module
120 constraint solver
122 window
124 selection widget
126 icon
128 icon
130 page
132 graphical object
134 graphical object
136 graphical object
300 root node
302 leaf node
304 leaf node
1 container grid line
2 container grid line
3 container grid line
4 container grid line
5 object grid line
6 object grid line
7 object grid line
8 object grid line
9 container grid line
10 container grid line
11 container grid line
12 object grid line
13 object grid line
14 object grid line
15 object grid line
16 container grid line

What is claimed is:

1. A method of entering a presentation into a computer, the method comprising the steps of:

a. providing a container delimited by an initial set of container grid lines;
b. providing a set of graphical objects, each graphical object of the set of graphical objects having a set of object grid lines for one of delimiting the graphical object and aligning with important graphical features of the object;
c. selecting the graphical objects of the set of graphical objects one-by-one;
d. placing each selected one graphical object within the container;
e. for an object grid line of the placed selected one graphical object that coincides with an initial container grid line, binding the object grid line to the initial container grid line to establish the spatial constraint that the object line and the initial container grid line have the same position;
f. for an object grid line of the placed selected one graphical object that is not coincident with a container grid line, generating an additional container line at the position of the non-coincident object grid line, and binding the non-coincident object grid line to the generated additional container grid line to create an association between the non-coincident object grid line and the generated additional container grid line to establish the spatial constraint that the associated non-coincident object grid line and the associated generated additional container grid line are coincident and have the same position;
g. for any resizing of a graphical object that involves changing the position of an object grid line of the graphical object, moving the generated additional container grid line associated with the object grid line to be changed while maintaining the coincident binding of the generated associated additional container grid line and the associated object grid line in order to change the associated object grid line of the graphical object;
h. correlating the object grid lines of one graphical object to the object grid lines of another graphical object indirectly through the intermediary of the bound initial container grid lines and the bound generated additional container grid lines;
i. storing in an hierarchical data structure the binding of the object grid lines of each graphical object and any associated bound initial container grid lines and associated bound generated additional container grid lines; and
j. applying a constraint resolution for automatic layout of the graphical objects to the stored hierarchical data structure and for automatically repositioning and resizing graphical objects based on the binding of the initial container grid lines and the generated additional container grid lines associated with the object grid lines of the graphical object to be moved.

2. A method according to claim 1 including the further step of providing snap-to-grid functionality of an object grid line of a graphical object positioned within a predetermined proximity to one of an initial container grid line and a generated additional container grid line.

3. A method according to claim 1 including the further step of selecting and applying a user-defined constraint from the group consisting of maintaining a spacing of said generated additional container grid lines, setting an aspect ratio of a selected graphical object and a minimum size of said selected graphical object, and text formatting said selected graphical object.

4. A computer program for entering a presentation into a computer embodied in a computer readable media for executing the following steps:

a. displaying on a computer monitor a container delimited by an initial set of container grid lines;
b. displaying on said computer monitor a set of graphical objects, each graphical object of the set of graphical objects having a set of object grid lines for one of delimiting the graphical object and aligning with important graphical features of the object;
c. providing a user interface for selecting graphical objects of the set of graphical objects one-by-one;
d. displaying on said computer monitor a selected one of the set of graphical objects by placing the selected one graphical object within the container;
e. for an object grid line of the placed selected one graphical object that coincides with an initial container grid line, binding the object grid line to the initial container grid line to establish the spatial constraint that the object line and the initial container grid line have the same position;
f. for an object grid line of the placed selected one graphical object that is not coincident with a container grid line, generating an additional container line at the position of the non-coincident object grid line, and binding the non-coincident object grid line to the generated additional container grid line to create an association between the non-coincident object grid line and the generated additional container grid line to establish the spatial constraint that the associated non-coincident object grid line and the associated generated additional container grid line are coincident and have the same position;
g. for any resizing of a graphical object that involves changing the position of an object grid line of the graphical object, moving the generated additional container grid line associated with the object grid line to be changed while maintaining the coincident binding of the generated associated additional container grid line and the associated object grid line in order to change the associated object grid line of the graphical object;
h. correlating the object grid lines of one graphical object to the object grid lines of another graphical object indirectly through the intermediary of the bound initial container grid lines and the bound generated additional container grid lines;
i. storing in an hierarchical data structure the binding of the object grid lines of each graphical object and any associated bound initial container grid lines and associated bound generated additional container grid lines; and
j. applying a constraint resolution for automatic layout of the graphical objects to the stored hierarchical data structure and for automatically repositioning and resizing graphical objects based on the binding of the initial container grid lines and the generated additional container grid lines associated with the object grid lines of the graphical object to be moved.

5. A computer program according to claim 4 including the further step of providing snap-to-grid functionality of an object grid line of a graphical object positioned within a predetermined proximity to one of an initial container grid line and a generated additional container grid line.

6. A computer program according to claim 4 including the further step of selecting and applying a user-defined constraint from the group consisting of maintaining a spacing of said generated additional container grid lines, setting an aspect ratio of a selected graphical object and a minimum size of said selected graphical object, and text formatting said selected graphical object.

7. A computer system for entering a presentation into a computer comprising:

a. a processor;
b. means for providing a container delimited by an initial set of container grid lines;
c. means for providing a set of graphical objects, each graphical object of the set of graphical objects having a set of object grid lines for one of delimiting the graphical object and aligning with important graphical features of the object;
d. means for selecting the graphical objects of the set of graphical objects one-by-one;
e. means for placing each selected one graphical object within the container;
f. for an object grid line of the placed selected one graphical object that coincides with an initial container grid line, binding the object grid line to the initial container grid line to establish the spatial constraint that the object line and the initial container grid line have the same position;
g. for an object grid line of the placed selected one graphical object that is not coincident with a container grid line, generating an additional container line at the position of the non-coincident object grid line, and binding the non-coincident object grid line to the generated additional container grid line to create an association between the non-coincident object grid line and the generated additional container grid line to establish the spatial constraint that the associated non-coincident object grid line and the associated generated additional container grid line are coincident and have the same position;
h. for any resizing of a graphical object that involves changing the position of an object grid line of the graphical object, moving the generated additional container grid line associated with the object grid line to be changed while maintaining the coincident binding of the generated associated additional container grid line and the associated object grid line in order to change the associated object grid line of the graphical object;
i. means for correlating the object grid lines of one graphical object to the object grid lines of another graphical object indirectly through the intermediary of the bound initial container grid lines and the bound generated additional container grid lines;
j. means for storing in an hierarchical data structure the binding of the object grid lines of each graphical object and any associated bound initial container grid lines and associated bound generated additional container grid lines; and
k. means for applying a constraint resolution for automatic layout of the graphical objects to the stored hierarchical data structure and for automatically repositioning and resizing graphical objects based on the binding of the initial container grid lines and the generated additional container grid lines associated with the object grid lines of the graphical object to be moved.

8. A computer system according to claim 7 including means for providing snap-to-grid functionality of an object grid line of a graphical object positioned within a predetermined proximity to one of an initial container grid line and a generated additional container grid line.

9. A computer system according to claim 7 including means for selecting and applying a user-defined constraint from the group consisting of maintaining a spacing of said generated additional container grid lines, setting an aspect ratio of a selected graphical object and a minimum size of said selected graphical object, and text formatting said selected graphical object.

* * * * *